United States Patent [19]
Hayakawa et al.

[11] Patent Number: 5,167,393
[45] Date of Patent: Dec. 1, 1992

[54] AUTOMOTIVE SEAT SLIDE DEVICE

[75] Inventors: Hatsuo Hayakawa; Mikio Honma, both of Yokohama, Japan

[73] Assignee: Ohi Seisakusho Co., Ltd., Yokohama, Japan

[21] Appl. No.: 753,947

[22] Filed: Sep. 3, 1991

[30] Foreign Application Priority Data

Sep. 20, 1990 [JP] Japan .............................. 2-98136[U]

[51] Int. Cl.⁵ ............................................. B60N 1/00
[52] U.S. Cl. .................................... 248/430; 297/344
[58] Field of Search ............... 248/429, 430, 420, 419, 248/424, 425, 393; 297/344, 346

[56] References Cited

U.S. PATENT DOCUMENTS

| | | | |
|---|---|---|---|
| 2,336,433 | 12/1943 | Woina | 248/430 |
| 4,602,758 | 7/1986 | Mann et al | 248/430 |
| 4,781,354 | 11/1988 | Nihei et al. | 248/429 |
| 4,809,939 | 3/1989 | Matsushima et al. | 248/430 |
| 4,813,643 | 3/1989 | Nihei | 248/430 |
| 4,852,846 | 8/1989 | Weier | 248/430 |
| 4,909,469 | 3/1990 | Nihei et al. | 248/429 |
| 4,969,622 | 11/1990 | Munchow et al. | 248/429 |
| 5,028,028 | 7/1991 | Yamada et al. | 248/430 |
| 5,052,751 | 10/1991 | Hayakawa et al. | 248/429 X |

FOREIGN PATENT DOCUMENTS

327747 4/1930 United Kingdom ................ 248/429

Primary Examiner—David L. Talbott
Attorney, Agent, or Firm—Foley & Lardner

[57] ABSTRACT

A seat slide device is disclosed, which comprises a molded lower rail which is secured to a vehicle floor and is formed with outwardly projected flange portions for increasing a mechanical strength thereof; and a molded upper rail which carries thereon a seat and is slidably enaged with the lower rail. A toothed structure is integral with the lower rail and has a plurality of axially aligned teeth. A latch member is carried by the upper rail and latchingly engageable with the teeth to achieve a latched engagement between the lower and upper rails. A reinforcing plate is lined on the lower rail. The reinforcing plate has a toothed portion which is lined on the toothed structure to reinforce the same.

19 Claims, 2 Drawing Sheets

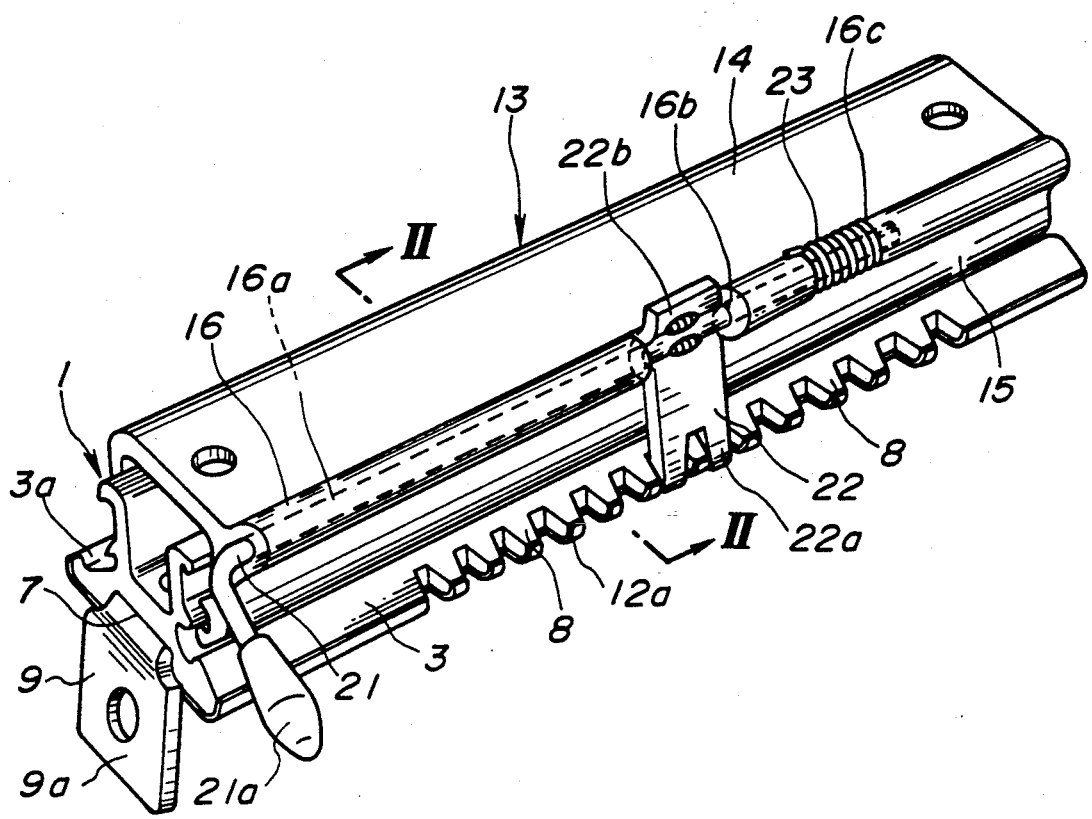
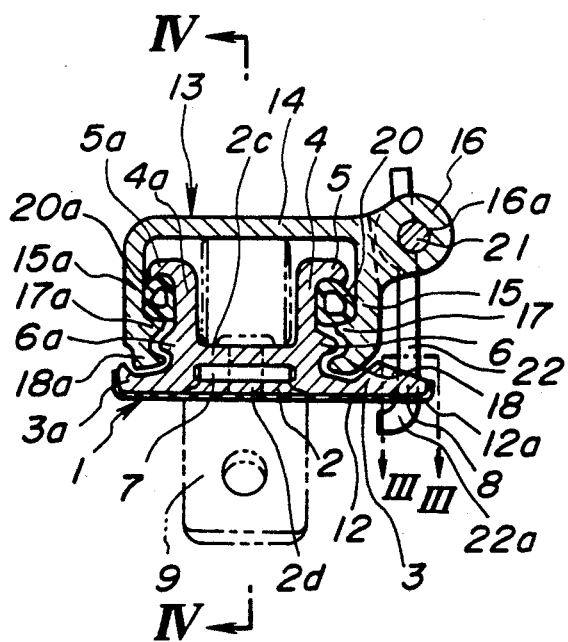
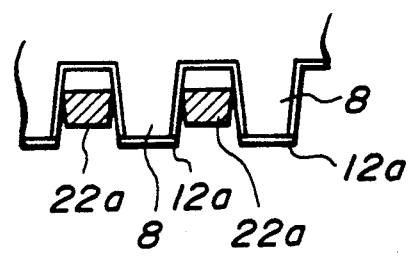

AUTOMOTIVE SEAT SLIDE DEVICE

BACKGROUND OF THE INVENTION

1. Field of the Invention

The present invention relates in general to seat slide devices for a motor vehicle, and more particularly to seat slide devices of a type which can adjust the fore-and-aft position of a seat.

2. Description of the Prior Art

In order to clarify the task of the present invention, one conventional seat slide device will be described with reference to FIG. 5 of the accompanying drawings, which device is disclosed in U.S. Pat. No. 4,813,643 granted on Mar. 21, 1989.

The device comprises a lower rail 102 which is secured to a vehicle floor through front and rear mounting brackets 101a and 101b. An elongate lock plate 106 is secured to a side portion of the lower rail 102 and extends along the same. The lock plate 106 is formed with a plurality of aligned and evenly spaced openings 106a.

An upper rail 103 which carries thereon a seat (not shown) is slidably disposed on the lower rail 102. The upper rail 103 has a larger bracket 104 secured thereto. The larger bracket 104 has a curled portion 104a by which a rear portion of a control rod 105 is rotatably supported. A smaller bracket 108 is secured to a front portion of the upper rail 103 to rotatably support the control rod 105. A front portion of the control rod 105 is bent to form a handle 105a.

A latch member 107 is secured to the control rod 105 at the larger bracket 104. Thus, the latch member 107 and the control rod 105 rotate like an integral unit. The latch member 107 has at its free end two latch pawls which are sized to be latchingly engageable with neighboring two of the openings 106a of the lock plate 106.

A coil spring 109 is disposed about the rear end of the control rod 105 and arranged to bias the control rod 105 to rotate in a clockwise direction in FIG. 5, that is, in a direction to achieve a latched engagement of the latch member 107 with the lock plate 106.

Upon requirement of position adjustment of the seat, the handle 105a of the control rod 105 is manipulated to pivot the rod 105 in a counterclockwise direction in FIG. 5 against the biasing force of the coil spring 109. With this, the latched engagement of the latch member 107 with the lock plate 106 is cancelled thereby permitting a free movement of the upper rail 103 (that is, the seat mounted on the upper rail 103) relative to the lower rail 102. When the upper rail 103 comes to a new desired position, the handle 105a is released from an operator's hand. With this, due to the biasing force of the coil spring 109, the latch pawls of the latch member 107 are brought into latching engagement with new neighboring two of the openings 106a of the lock plate 106. With this, the seat becomes locked at the new desired position.

However, the seat slide device of the above-mentioned type has the following drawbacks.

That is, due to its inherent construction, it is very difficult to reduce the weight of the device without sacrificing the mechanical strength of the same.

In fact, hitherto, an attempt has been made for reducing the weight of the device by using aluminium alloy as a material for the lower and upper rails. However, due to the nature of aluminium alloy, the seat slide device produced has failed to exhibit a satisfied mechanical strength.

SUMMARY OF THE INVENTION

It is therefore an object of the invention to provide a seat slide device which is constructed light in weight and robust in construction.

According to the present invention, there is provided a seat slide device whose main parts are constructed of light-weight material, such as aluminium alloy or the like.

According to the present invention, there is provided a seat slide device for sliding a seat relative to a floor, which device comprises a molded lower rail secured to the floor, the lower rail being formed with outwardly projected flange portions for increasing a mechanical strength thereof; a molded upper rail carrying thereon the seat and slidably engaged with the lower rail; a toothed structure integral with one of the lower and upper rails, the toothed structure having a plurality of axially aligned teeth; a latch member carried by the other of the lower and upper rails, the latch member being latchingly engageable with the teeth to achieve a latched engagement between the lower and upper rails; and a reinforcing plate lined on the one of the lower and upper rails, the reinforcing plate having a toothed portion which is lined on the toothed structure to reinforce the same.

BRIEF DESCRIPTION OF THE DRAWINGS

Other objects and advantages of the present invention will become apparent from the following description when taken in conjunction with the accompanying drawings, in which:

FIG. 1 is a perspective view of a seat slide device according to the present invention;

FIG. 2 is a sectional view taken along the line II—II of FIG. 1;

FIG. 3 is a sectional view taken along the line III—III of FIG. 2;

DETAILED DESCRIPTION OF THE INVENTION

Figure 4:
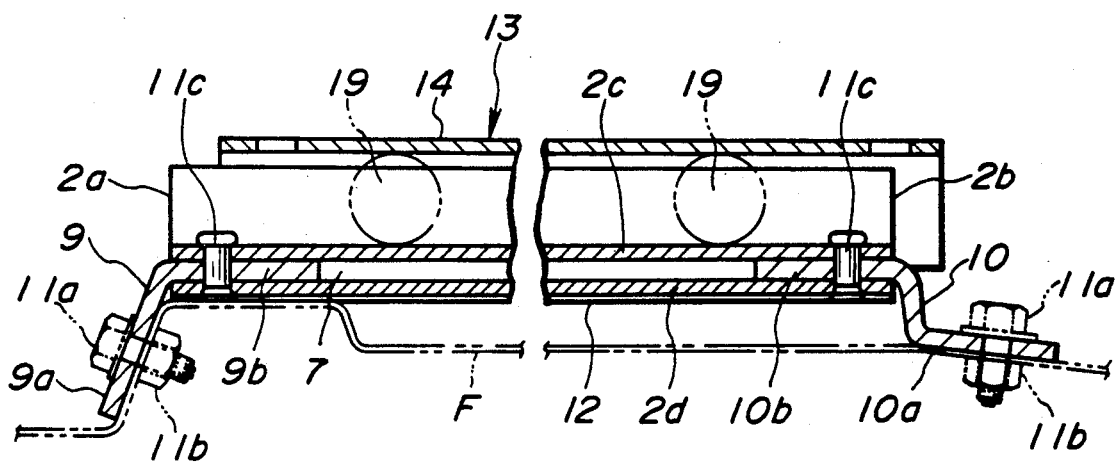
FIG. 4 is a sectional view taken along the line IV—IV of FIG. 2.

Referring to FIGS. 1 to 4 of the drawings, there is shown a seat slide device of the present invention.

As is best shown in FIG. 1, the seat slide device comprises a channel-like lower rail 1 which is constructed of molded aluminium alloy. For producing the lower rail 1, a conventional extrusion molding technique is employed.

As is shown in FIG. 2, the lower rail 1 comprises an axially extending base portion 2, two axially extending lower flange portions 3 and 3a projected horizontally from both sides of the base portion 2, two axially extending side wall portions 4 and 4a raised vertically from both sides of the base portion 2, and two axially extending upper flange portions 5 and 5a projected outwardly from upper ends of the side wall portions 4 and 4a.

The side wall portions 4 and 4a are respectively formed at their outside surfaces with axially extending ridge portions 6 and 6a.

As is understood from FIGS. 2 and 3, the base portion 2 of the lower rail 1 is formed with an elongate flat bore 7 which extends from a front end 2a of the rail 1 to a rear end 2b of the same. The bore 7 is produced during the process of the extrusion molding.

It is to be noted that due to the provision of the horizontally projected lower flange portions 3 and 3a, the sectional area of the lower rail 1 is increased and thus the mechanical strength of the lower rail 1 is increased.

As is understood from FIG. 1, one lower flange portion 3 is formed with a plurality of teeth 8 which are evenly spaced. These teeth 8 are formed by using a stamping technique.

As is shown in FIG. 4, the lower rail 1 is secured to a vehicle floor "F" through front and rear mounting brackets 9 and 10. Each mounting bracket 9 or 10 is constructed of a stamped steel plate and comprises a base portion 9a or 10a which is secured through a bolt 11a and a nut 11b to the vehicle floor "F" and a holding portion 9b or 10b which is put into the bore 7 from the front (or rear) end of the same.

As is well shown in FIGS. 1 and 2, the lower surface of the lower rail 1 is lined with a reinforcing plate 12 which is constructed of a stamped steel plate. As is seen from FIG. 1, the reinforcing plate 12 has a plurality of teeth 12a which are mated with the teeth 8 of the lower flange portion 3 of the lower rail 1. More specifically, each tooth 12a of the reinforcing plate 12 is curved upward to sufficiently and intimately cover a corresponding tooth 8 of the lower flange portion 3 of the lower rail 1. With this lining, the toothed flange portion 3 of the lower rail 1 is reinforced sufficiently.

Rivets 11c are used for securing the lower rail 1 to the holding portions 9b and 10b of the mounting brackets 9 and 10. That is, each rivet 11c passes through aligned four openings which are formed in an upper wall part 2c of the base portion 2, the holding portion 9b or 10b of the bracket 9 or 10, a lower wall part 2d of the base portion 2 and the reinforcing plate 12. Then, each rivet 11c has its head caulked in a manner to cause the upper and lower wall parts 2c and 2d of the base portion 2 to tightly sandwich therebetween the holding portion 9b or 10b of the mounting bracket 9 or 10.

Slidably disposed on the lower rail 1 is a channel-like upper rail 13 which is constructed of a molded aluminium alloy. Like the lower rail 1, the upper rail 13 is produced by employing a conventional extrusion molding technique.

Although not shown in the drawings, a seat is securedly mounted on the upper rail 13 to move therewith.

As is seen from FIGS. 1 and 2, the upper rail 13 comprises an axially extending base portion 14, two axially extending side wall portions 15 and 15a projected downward from both sides of the base portion 14, and an axially extending tubular portion 16 which extends along the junction part between the base portion 14 and the side wall portion 15. The cylindrical through bore of the tubular portion 16 is designated by numeral 16a.

As is understood from FIG. 2, when the upper rail 13 is properly mounted on the lower rail 1, the base portion 14 is in parallel with the base portion 2 of the lower rail 1, and the side wall portions 15 and 15a of the upper rail 14 are positioned outside of the side wall portions 4 and 4a of the lower rail 1.

The side wall portion 15 is formed at its inside surface with first and second axially extending ridges 17 and 18 between which an axially extending groove (no numeral) is defined for slidably receiving the ridge 6 of the lower rail 1. Similar to this, the other side wall portion 15a of the upper rail 14 is formed at its inside surface with first and second axially extending ridges 17a and 18a between which an axially extending groove (no numeral) is defined for slidably receiving the ridge 6a of the lower rail 1.

As is understood from FIGS. 2 and 4, in order to smooth the movement of the upper rail 13 relative to the lower rail 1, front and rear rollers 19 are disposed between the base portions 2 and 14 of the lower and upper rails 2 and 13. Furthermore, in order to assure a guided movement of the upper rail 13 relative to the lower rail 1, elongate plastic sliders 20 or 20a is slidably held between the side wall portions 4 and 15 (or, 4a and 15a) of the lower and upper rails 1 and 13. That is, each slider 20 or 20a is intimately but slidably received in an elongate clearance (no numeral) which is defined or enclosed by the side wall portion 4 or 4a and the upper flange portion 5 or 5a of the lower rail 1 and the side wall portion 15 or 15a and the first ridge 17 or 17a of the upper rail 13.

When an external force is applied to the upper rail 13 in a direction to raise the same from the lower rail 1, the first ridge 17 or 17a of the upper rail 13 is forced to abut against the upper flange portion 5 or 5a of the lower rail 1 through the slider 20 or 20a and at the same time, the second ridge 18 or 18a of the upper ail 13 is forced to abut against the ridge 6 or 6a of the lower rail 1. Thus, undesired disengagement of the upper rail 13 from the lower rail 1 is suppressed or at least minimized even upon a vehicle collision or the like.

As is seen from FIG. 1, the tubular portion 16 of the upper rail 13 is formed at its middle and rear portions with first and second cuts 16b and 16c.

Rotatably received in the bore 16a of the tubular portion 16 is a control rod 21 which has a front portion which is bent to form a handle 21a. Due to provision of the first and second cuts 16b and 16c of the tubular portion 16, corresponding portions of the control rod 21 are exposed to outside.

At the first cut 16b, a latch member 22 is secured to the control rod 21 to pivot therewith. For minimizing a play of the latch member 22 in the first cut 16b, the axial length of the cut 16b is so made as to substantially match with the width of the latch member 22. The latch member 22 includes a base portion 22b welded to the control rod 21 and a forked portion 22a which is latchingly engageable with one of the teeth 8 of the lower rail 1.

At the second cut 16c, a coil spring 23 is disposed around the control rod 21 with one end hooked to the control rod 21 and the other end hooked to tubular portion 16. With this spring 23, the control rod 21 is biased to rotate in a clockwise direction in FIG. 1, that is, in a direction to achieve a latched engagement of the latch member 22 with one of the teeth 8 of the lower rail 1.

Upon the requirement of a position adjustment of the seat, the handle 21a is manipulated to pivot the control rod 21 in a counterclockwise direction in FIG. 1 against the force of the coil spring 23. With this, the latched engagement of the latch member 22 with one of the teeth 8 of the lower rail 1 is cancelled and thus thereafter the movement of the upper rail 13 relative to the lower rail 1 is permitted.

When the upper rail 13 comes to a new desired position, the handle 21a is released from an operator's hand. With this, due to the biasing force of the coil spring 23, the latch member 22 is brought into latching engagement with new one of the teeth 8 thereby to lock the upper rail 13 (that is, the seat on the upper rail 13) at the new desired position. If the latch member 22 fails to make a proper engagement with the new tooth at such new position, a slight shock applied to the seat may induce the proper engagement.

In the following, advantages of the present invention will be described.

Figure 5:
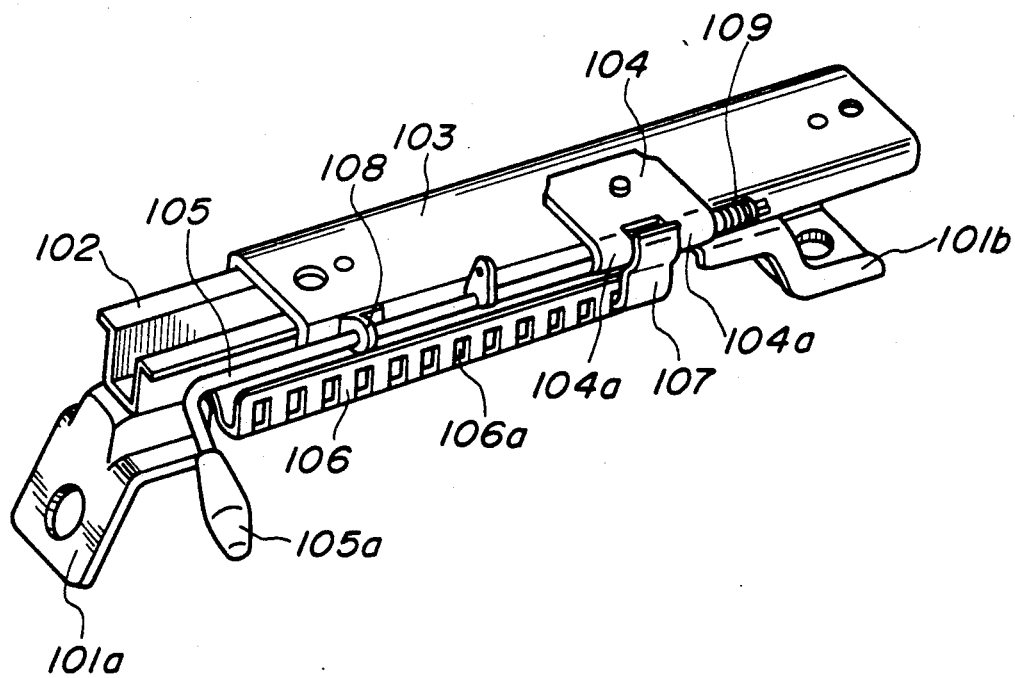
FIG. 5 is a perspective view of a conventional seat slide device.

First, because the upper rail 13 is molded to have the integral tubular portion 16, there is no need of fixing separate brackets, such as the larger and smaller brackets 104 and 108 of the afore-mentioned conventional seat slide device (see FIG. 5), to the upper rail for carrying the control rod 21. This is very advantageous when considering the difficulty of securing a separate member to an aluminium-alloy member.

Second, since the control rod 21 is almost wholly received in the integral tubular portion 16 of the upper rail 13, the mechanical strength of the upper rail 13 is increased.

Third, due to provision of the two lower flange portions 3 and 3a, the sectional area of the lower rail 1 is enlarged and thus the mechanical strength of the same is increased.

Fourth, because the lower rail 1 and the teeth 8 of the same are lined with the reinforcing plate 12, the mechanical strength of them is increased. Furthermore, due to provision of such reinforcing plate 12, securing the front and rear mounting brackets 9 and 10 to the lower rail 1 is assuredly made by the rivets 11c.

Fifth, since the front and rear mounting brackets 9 and 10 are secured to the lower rail 1, the front and rear portions of the lower rail 1 are reinforced.

Although the above description is directed to the device wherein the lower rail 1 has the teeth 8 and the upper rail 13 carries the latch member 22, a modification may be employed wherein the lower rail 1 carries the latch member 22 and the upper rail 13 has the teeth 8.

What is claimed is:

1. A seat slide device for sliding a seat relative to a floor, comprising:
   a molded lower rail secured to said floor, said lower rail being formed with outwardly projected flange portions for increasing a mechanical strength thereof;
   a molded upper rail carrying thereon the seat and being slidably engaged with said lower rail;
   a toothed structure integral with one of said lower and upper rails, said toothed structure having a plurality of axially aligned teeth;
   a latch member carried by the other of said lower and upper rails, said latch member being latchingly engageable with said axially aligned teeth to achieve a latched engagement between said lower and upper rails; and
   a reinforcing plate lined on said one of said lower and upper rails, said reinforcing plate having a toothed portion which is lined on said toothed structure to reinforce the same, said toothed portion having a plurality of teeth which each mate with a corresponding one of said plurality of axially aligned teeth of said toothed structure.

2. A seat slide device as claimed in claim 1, in which said toothed structure is integral with said lower rail and said latch member is carried by said upper rail.

3. A seat slide device as claimed in claim 2, further comprising:
   a tubular portion which is integral with said upper rail and which extends along the same;
   a control rod rotatably received in said tubular portion, said control rod having a given portion to which said latch member is secured; and
   biasing means for biasing said control rod to rotate in a direction to achieve a latched engagement between said latch member and said teeth of said toothed structure.

4. A seat slide device as claimed in claim 3, in which said lower and upper rails each have channel-structures which are axially slidably interlocked with each other and side wall portions, said side wall portions of said upper rail being placed outside of said side wall portions of said lower rail.

5. A seat slide device as claimed in claim 4 wherein said upper and lower rails have opposed flat wall portions, and further comprising rollers each being disposed between said opposed flat wall portions of said lower and upper rails.

6. A seat slide device as claimed in claim 5, further comprising a plastic slider which is slidably disposed between each of said side wall portions of said lower rail and the corresponding side wall portion of said upper rail.

7. A seat slide device as claimed in claim 6, further comprising a rail disconnection inhibitor means which inhibits a disconnection of said upper rail from said lower rail even when an abnormal external force is applied to said upper rail in a direction to raise said upper rail from said lower rail.

8. A seat slide device as claimed in claim 7, in which said rail disconnection inhibitor means comprises:
   an axially extending ridge portion integrally formed on each of said side wall portions of said lower rail; and
   an axially extending ridge integrally formed on each of said side wall portions of said upper rail, said ridge being slidably engaged with said ridge portion.

9. A seat slide device as claimed in claim 2, in which said lower rail is formed with an elongate flat bore which extends from one end of said lower rail to the other end of the same.

10. A seat slide device as claimed in claim 9, further comprising mounting brackets for securing said lower rail to said floor, each mounting bracket including a base portion which is bolted to said floor and a holding portion which is thrust into said bore and secured to said lower rail through a rivet.

11. A seat slide device as claimed in claim 3, in which said tubular portion of said upper rail is formed with a cut through which said given portion of said control rod to which said latch member is secured is exposed to outside of said tubular portion.

12. A seat slide device as claimed in claim 11, in which said tubular portion of said upper rail is further formed with another cut through which another portion of said control rod is exposed to outside of said tubular portion.

13. A seat slide device as claimed in claim 12, in which said another cut receives therein a coil spring which serves as said biasing means.

14. A seat slide device as claimed in claim 13, in which said coil spring is disposed about said control rod and has one end hooked to said control rod and the other end hooked to said tubular portion.

15. A seat slide device as claimed in claim 2, in which each of said lower and upper rails is constructed of a molded aluminium alloy, said lower rail including an axially extending base portion, two axially extending lower flange portions projected horizontally from both sides of the base portion, two axially extending side wall portions raised vertically from both sides of the base portion, and two axially extending upper flange portions projected outwardly from upper ends of the side wall portions, and said upper rail including an axially extending base portion, and two axially extending side wall portions projected downward from both sides of the base portion, wherein said upper rail is slidably disposed on said lower rail in such a manner that the side wall portions of the upper rail are positioned outside of the side wall portions of the lower rail.

16. A seat slide device as claimed in claim 15, in which said upper rail is integrally formed with an axially extending tubular portion which extends along a junction part between the base portion and the side wall portion.

17. A seat slide device as claimed in claim 16, further comprising:

a control rod rotatably received in said tubular portion, said control rod having a given portion to which said latch member is secured; and a coil spring disposed about said control rod for biasing said control rod to rotate in a direction to achieve a latched engagement between said latch member and said teeth of said toothed structure.

18. A seat slide device as claimed in claim 1, in which each of said lower and upper rails is constructed of a molded aluminium alloy.

19. A seat slide device as claimed in claim 1, wherein each of said plurality of teeth of said toothed portion is curved to cover said corresponding one of said plurality of axially aligned teeth of said toothed structure.

* * * * *